(No Model.)
W. HARRISON.
APPARATUS FOR WELDING WHEEL TIRES.
No. 326,869. Patented Sept. 22, 1885.
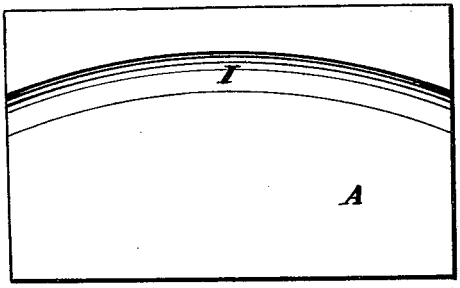
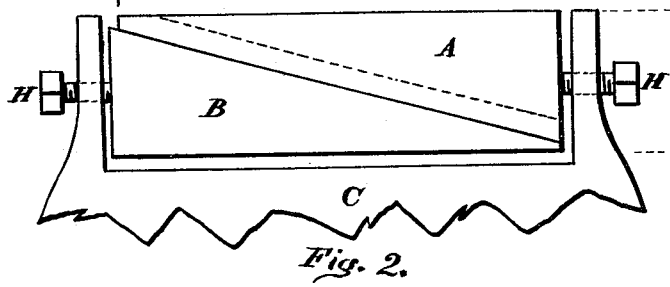
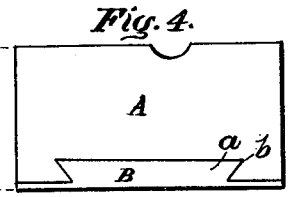
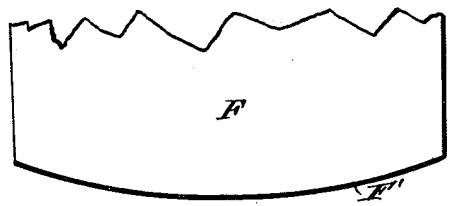
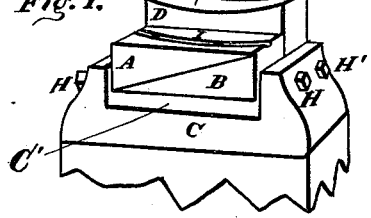
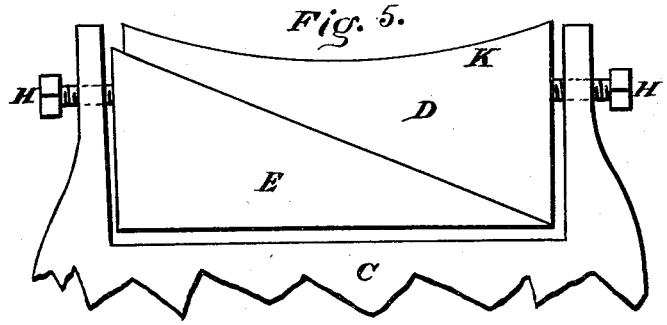
Witnesses,
Jo. L. Coombs
Robert Everett
Inventor,
William Harrison,
By James L. Norris,
Atty.

UNITED STATES PATENT OFFICE.

WILLIAM HARRISON, OF WALKER, KENT COUNTY, MICHIGAN.

APPARATUS FOR WELDING WHEEL-TIRES.

SPECIFICATION forming part of Letters Patent No. 326,869, dated September 22, 1885.

Application filed May 26, 1884. (No model.)

*To all whom it may concern:*

Be it known that I, WILLIAM HARRISON, a citizen of the United States, residing in the township of Walker, in the county of Kent and State of Michigan, have invented an Improvement in Dies for Welding Wheel-Tires and other Articles, of which the following is a specification.

It is the purpose of my invention to prevent "kinking" the tire or other iron during the process of welding, to give the weld a true and smooth surface, and in the case of a tire to leave the welded portion in a true circle, to complete the welding without hammering or other hand-finishing, and to perform the work more expeditiously and at less expense of time and money than is possible by any other known method.

My invention consists in the several novel features of construction and combinations of parts hereinafter fully described, and definitely pointed out in the claims.

Referring to the drawings forming part of this application, Figure 1 is a perspective view of the anvil with the dies in place. Fig. 2 is a front elevation of the lower die upon the front part of the anvil. Fig. 3 is a plan view of the same. Fig. 4 is an end elevation of the same. Fig. 5 is a rear elevation of the lower die upon the back part of the anvil, together with its upper die. Fig. 6 is an end elevation of the lower die shown in Fig. 5. Fig. 7 is a detail perspective of the upper die, which acts in conjunction with the die shown in plan in Fig. 3.

In the said drawings the reference-letters A and B denote what may be termed the "front" lower die, which lies within a recess, C', formed in the anvil-block C. This die is formed in two parts, as shown, each part having in longitudinal section the form of a right-angled triangle, the lower portion resting upon its longer leg, while the subtense of the upper part rests upon the hypotenuse of the lower. Set-screws H H are tapped through the ends of the anvil and bear against the ends of each portion of said die. By turning these screws the face or matrix of the die may be adjusted relatively to the upper die with great accuracy. In order to secure accurate motion of the one upon the other the parts are united by a tongue and groove, $a$ $b$. (Shown in Fig. 4.)

In the upper face of the portion A is formed a groove or channel, I, having a rounded form in cross-section and curved longitudinally to correspond with the curvature of the tire to be welded.

The lower rear die seen in Fig. 1 lies behind the die just described, and is constructed, like the latter, in two parts or sections, D and E, united by a tongue and groove, $d$ and $e$, and adjusted by set-screws H' in the manner already described in connection with the die A B.

The face or matrix D' of the rear lower die is concaved longitudinally to conform to the curvature of the tire, and said curved face is slightly inclined downward from the front toward the rear edge, so that the tire may incline somewhat toward the operator when its perimeter is laid upon the die.

The reference letter G, Fig. 7, denotes the front upper die, which is provided with a curved groove, I', corresponding in shape with the groove I in the lower die. In a similar manner the rear upper die, F, has a convex face, F', corresponding with the concave face of the lower die D. Both the upper dies are operated by any common press suitable in size and strength for the purpose—such, for example, as a Long Allstatter Company's double-ended press—and the construction and arrangement of the parts are such that the upper and lower dies never come together, even when no iron is placed between them, the upper die only striking down near enough to the lower to give the requisite blow to the iron placed on the corresponding lower die. In setting the front and rear dies different spaces are provided for, because in welding tires the width and thickness are not the same; and the reason for using two sets of dies is to enable the operator to weld iron having two dimensions.

The lower dies may be made solid instead of in sections, as shown, and when so constructed the spaces between the upper and lower dies may be regulated to suit the width and thickness of the iron to be welded by the use of "liners" or strips of iron placed beneath the lower die to raise it, or inserted above the upper die to lower the latter.

The dies are operated, as already stated, in a press, the lower dies being seated in a stationary head-block and the upper dies in a similar block attached to the upper part or head of the press, which moves up and down with a two-inch stroke, making about forty strokes a minute. At each stroke the dies approach each other within a space equal to the thickness of the iron being welded and to its width, in respect of the front and rear dies, the former acting upon the flat or wider faces of the iron and the latter upon its edges. In welding iron of different dimensions, therefore, different dies will be required.

In welding tires the operation is as follows: The tire is taken from the fire and placed on the rear lower die, D, being held in a nearly vertical position, inclining slightly toward the operator, who stands behind the die. Here it receives the stroke of the upper back die, F, after which the tire is lowered to a horizontal position and moved forward until its edge rests in the groove I in the lower front die, A, where it receives the stroke of the upper front die, G. It is then moved back to the rear die, where it is again acted upon. The tire is thus alternated between the two pairs of dies until the welding is completed and the tire reduced to proper shape and size, which ordinarily requires two or three strokes from each die, the operation occupying from about six to nine seconds.

Prior to the welding and before heating the tire should be run and the proper length marked. The piece that is taken off is cut on a scarf and the two ends of the tire lapped, as in the case of a common weld, placing the scarfed end on top. It is then heated and submitted to the dies.

The same operation is performed in welding iron of any other shape.

By my invention the labor of welding is greatly reduced, the operation is more perfectly performed, the tire is left in a true shape and size, and the weld is finished in a manner superior to hand-welding. I effect, moreover, a great economy in time and expense, since by the use of my invention the same number of workmen can accomplish twice the amount of work in the same time that can be done by hand, while the work will be very far superior both in quality and in appearance.

Having thus described my invention, what I claim is—

1. In a welding-machine, a die constructed in two sections, each having in longitudinal section the form of a right-angled triangle, and the subtense of one section being laid upon that of the other, in combination with set-screws bearing against the end of each part, substantially as described.

2. In a welding-machine, the combination, with the angular die-section A, of the section B, having a similar form, the two being united by a tongue and groove, $a$ and $b$, and means, substantially as described, for adjusting one section relatively to the other, substantially as described.

3. In a welding-machine, the combination, with rear and front lower dies, one acting upon the perimeter of a tire and the other upon its edge, of corresponding upper dies, the tire being submitted to the action of the rear and front dies alternately, substantially as described.

4. In a welding-machine, the combination, with the lower dies, A and D, the former having a groove, I, and the latter a concave face, K, of the upper dies, G and F, the former having a groove, I', and the latter a convex face, F', substantially as described.

WM. HARRISON.

Witnesses:
JOHN A. LAURENCE,
HENRY TEMPLE.